United States Patent [19]

Rizo

[11] Patent Number: 4,716,633

[45] Date of Patent: Jan. 5, 1988

[54] FIXING DEVICE, ESPECIALLY FOR PANELS

[75] Inventor: Léandre Rizo, St-Ouen l'Aumone, France

[73] Assignee: ITW de France, Beauchamp, France

[21] Appl. No.: 17,083

[22] Filed: Feb. 20, 1987

[30] Foreign Application Priority Data

Feb. 17, 1986 [FR] France ................................ 86 02075

[51] Int. Cl.⁴ ........................ A44B 21/00; F16B 13/06
[52] U.S. Cl. ........................................ 24/453; 24/297; 24/326; 411/508
[58] Field of Search ........................ 24/453, 297, 326; 411/508, 57; 174/138 D

[56] References Cited

U.S. PATENT DOCUMENTS

| | | | |
|---|---|---|---|
| 3,988,808 | 11/1976 | Poe et al. | 24/326 |
| 4,122,583 | 10/1978 | Grittner et al. | 24/297 |
| 4,176,428 | 12/1979 | Kimura | 24/326 |
| 4,312,614 | 1/1982 | Palmer et al. | 411/508 |
| 4,363,160 | 12/1982 | Wibrow | 24/297 |
| 4,403,377 | 9/1983 | Mizusawa | 24/297 |
| 4,629,356 | 12/1986 | Hayashi | 24/297 |

FOREIGN PATENT DOCUMENTS

| | | | |
|---|---|---|---|
| 81317 | 7/1963 | France | 24/297 |
| 676355 | 11/1964 | Italy | 24/297 |

Primary Examiner—Victor N. Sakran
Attorney, Agent, or Firm—J. P. O'Brien; T. W. Buckman

[57] ABSTRACT

A device suitable for fixing panels comprises a male part having a mounting head and an elongate body between the mounting head and a retaining head. The retaining head has a retaining surface directed towards the mounting head, a snap-fastener surface, and a retaining edge defined by the intersection of the retaining surface with the snap-fastener surface. A female part of the device has a receptacle for the body of the male part and at least one circumferential sector for retaining the retaining head of the male part in the axial direction. The retaining edge is adapted to penetrate the retaining sector(s) to provide an axial retention opposing withdrawal of the male part from the receptacle in the female part.

5 Claims, 1 Drawing Figure

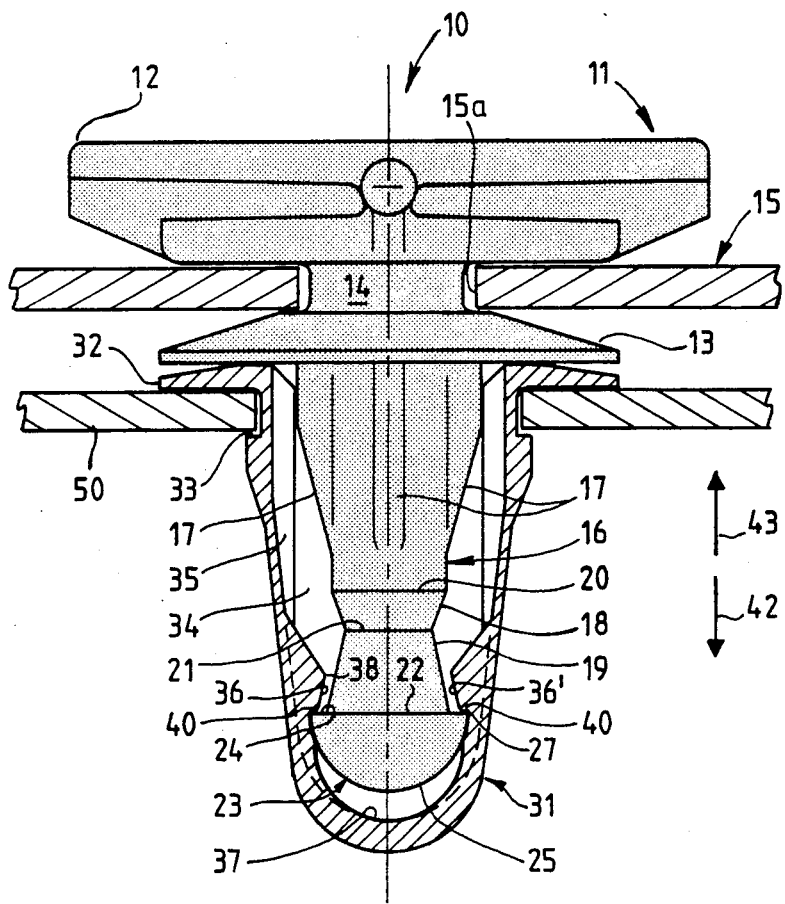

FIXING DEVICE, ESPECIALLY FOR PANELS

BACKGROUND OF THE INVENTION

1. Field of the Invention

The present application concerns a fixing device, especially for panels.

The present application is more particularly, but not exclusively, concerned with a fixing device designed for mounting decorative lining panels to the interior of automobile vehicles. The problem is to be able to fix onto a supporting first panel integrated into the structure of the vehicle a lining panel, made from plastics material or skai, for example, using a fixing device comprising a male part and a female part, the female part being attached to the support while the male part is mounted on the lining panel.

Such panel mounting devices are of obvious utility in other sectors of industry.

2. Description of the Prior Art

Fixing devices of this kind are known from the prior art, specifically from U.S. Pat. No. 4,176,428 in the name of the Japanese company NIFCO. The device comprises a male part having an elongate body extending between a mounting head on which the panel to be fixed is mounted and a retaining head and a female part having a receptacle for the body with at least one circumferential sector for retaining the retaining head axially.

In the NIFCO device the retaining head is spherical while the female part comprises three axial retention sectors defining a substantially circular passage the diameter of which is less than that of the spherical head. The male and female parts are made of plastic, the plastics material being chosen so that when the male part is inserted into the female part the spherical retaining head pushes apart the circumferential retaining sectors and is then accommodated downstream of the latter. This is, in fact, a snap-fastener type mounting.

The present invention is concerned with an improvement on the NIFCO device intended to make it simpler in structural terms and stronger in terms of its resistance to axial forces exerted on it tending to separate the male member from the female member.

The structure briefly described above is such that if an axial withdrawal force is applied equal to that applied during mounting to snap the male part into the female part, the male part can be separated from the female part. In some cases, however, it is desirable to have a device offering greater resistance to traction forces tending to separate the male part from the female part.

SUMMARY OF THE INVENTION

The present invention consists in a fixing device comprising a male part having a mounting head, a retaining head having a retaining surface directed towards said mounting head, a snap-fastener surface, a retaining edge defined by the intersection of said retaining surface with said snap-fastener surface, and an elongate body between said mounting head and said retaining head, and a female part having a receptacle for said body and at least one circumferential sector for retaining said retaining head axially, wherein said retaining edge is adapted to penetrate said at least one retaining sector to provide an axial abutment opposing withdrawal of said male part from said receptacle.

By virtue of these arrangements the fixing device in accordance with the invention offers significantly greater resistance to traction forces tending to separate the male part from the female part than the prior art device briefly described above. In the NIFCO device the retaining head is spherical and is accommodated in a spherical shape receptacle. The spherical surface of the retaining head has the same snap-fastener surface function during assembly as during deliberate or accidental demounting of the device. In both cases the spherical snap-fastener surface cooperates with the axial retaining sectors to force them apart.

On the other hand, in the device in accordance with the present invention the snap-fastener surface forces apart the axial retaining circumferential sectors during mounting but, after mounting, because the retaining edge penetrates into the material of the axial retaining sector or sectors, and so creates one or more additional axial abutment points, the device has a greater resistance to axial forces that may be exerted on the male part with a view to withdrawing it from the female part. This resistance is much higher than the force needed to snap-fasten the device. During snap fastening, the snap-fastener surface on the male part cooperates to this end with the retaining sectors to force them apart and enable the retaining head to move past them whereas, after snap fastening, the retaining edge cooperates with the retaining sectors to oppose withdrawal of the male part.

In one preferred embodiment of the invention the retaining head is hemispherical and the retaining surface is a plane radial surface defining the upper part of a hemisphere. The retaining edge is therefore a circular edge. Also, the material from which the female part is made is a material having substantially lower hardness characteristics than that from which the male part is made.

By virtue of these provisions the fixing device in accordance with the invention is simple and economical to manufacture.

The characteristics and advantages of the invention will emerge from the following description given by way of example and with reference to the appended drawing.

BRIEF DESCRIPTION OF THE DRAWING

The single FIGURE shows a preferred embodiment of the fixing device in elevation and cross-section.

DESCRIPTION OF THE PREFERRED EMBODIMENT

The fixing device 10 shown in the FIGURE has a general structure of the same type as that described in the previously mentioned U.S. Pat. No. 4,176,428.

The device 10 comprises a male part 11 and a female part 31. The male part 11 comprises a mounting head 12 and a pressure head 13 axially offset relative to the mounting head 12. The heads 12 and 13 are linked by a cylindrical member 14. As shown, and as is explained in the previously mentioned US patent, the male part is inserted into an oriface 15a in a panel 15 to be fixed.

The male part 11 comprises a generally cylindrical body 16 having over part of its height, below the pressure head 13, axial centering and entrainment ribs 17.

Below the lower end of the ribs 17 the cylindrical body 16 features a restriction defined by two opposed frustoconical portions 18 and 19, the larger end 20 of the upper frustoconical portion 18 being directed upwards and the two frustoconical portions 18 and 19 sharing a common smaller diameter end 21. The larger diameter end 22 of the lower frustoconical portion 19 adjoins a member 23 of generally hemispherical shape, this member being referred to hereinafter as the retaining head.

In accordance with the invention the retaining head 23 has a retaining surface, in this instance the annular surface 24, coplanar with the larger diameter end 22 of the lower frustoconical portion 19, this annular surface 24 facing towards the mounting head 12, and a so-called snap-fastener surface 25, in this instance consisting of the outside surface of the one-half-sphere constituting the head 23. A retaining edge 27, which is circular in this instance, is defined by the intersection of the retaining surface 24 with the snap-fastener surface 25.

The female part 31 comprises an elastic head 32 associated with axial retaining annular sectors 33 substantially offset axially from the elastic head 32 as explained in U.S. Pat. No. 4,176,428. These provisions serve to fix the female part 31 to a support panel 50.

The female part 31 essentially comprises a receptacle 34 the upper part of which is substantially cylindrical. In this upper part axial ribs 35 are disposed to entrain the male part 11 through the intermediary of the axial ribs 17 in the case where, in the usual way, the combination of the male member 11 and the female member 31 is pre-assembled and mounted by rotation in the member to be fixed.

Downstream of the axial ribs 35 the receptacle 34 comprises two axial retaining circumferential sectors 36, 36'. In an alternative embodiment, not shown, having the same representation in axial cross-section as that currently being described, the female part 31 comprises a single axial retaining circumferential sector extending all around the internal receptacle 34.

On the downstream side of the retaining circumferential sector or sectors the receptacle 34 is of substantially spherical shape (reference numeral 37).

The male part 11 and the female part 31 are made from plastics material, the hardness of the plastics material from which the female part is made being significantly lower than that from which the male part 11 is made.

In the embodiment being described, the male part is in polypropylene having a hardness of at least 70 N/mm$^2$ (as per standard DIN 53 436). The female part is made from polypropylene having a hardness of approximately 55 N/mm$^2$ (as per standard DIN 53 436).

It will be noted that the diameter of the circular retaining edge 27 is substantially less than that of the opening 38 defined by the axial retaining circumferential sector or sectors 36, 36'.

During insertion of the male part into the female part, the snap-fastener surface 25 exerts radial pressure against the axial retaining circumferential sectors 36, 36' with the result that all of the retaining head 23 passes through the opening 38 as shown in the FIGURE.

The retaining edge 27 then penetrates into the material of the retaining sector or sectors 36, 36' and therefore creates in the latter an axial abutment point 40 opposing withdrawal of the male part.

Thus during fitting when a thrust is exerted on the male part as shown by the arrow 42 the snap-fastener surface 25 of the retaining head 23, which is hemispherical in this embodiment, exerts a radial thrust on the retaining circumferential sectors 36, 36' and so widens the opening 38 to enable the head 23 to pass through. This radial thrust is proportional to the axial thrust 42. However, once this insertion has been achieved, if traction is applied to the male part 11 in the direction of the arrow 43 this serves to further embed the retaining edge 27 into the material of the sectors 36, 36'; the first effect of this is to reinforce the abutment 40 and the second effect is to increase the retaining force opposing withdrawal of the male part 11.

Such withdrawal can only be achieved by applying an axial force in the direction of the arrow 43 that is very much greater than that needed to snap together the parts 11 and 31, a force likely to lead to damage of the fixing device 10.

It is to be understood that the present invention is in no way limited to the embodiment described and shown but rather encompasses any variants thereon within the competence of those skilled in the art.

Thus the present invention is not limited to a continuous hemispherical snap-fastener surface 25. To the contrary, those skilled in the art could use other well-known snap-fastener surfaces such as a conical surface, for example. Similarly, the snap-fastener surface and consequently the retaining edge do not need to be continuous to fulfill the functions described in this application.

There is claimed:

1. Fixing device comprising a male part having a mounting head, a pressure head axially spaced from said mounting head, a retaining head having a retaining surface directed towards said mounting head, a snap-fastener surface, a retaining edge defined by the intersection of said retaining surface with said snap-fastener surface, an elongate cylindrical body between said pressure head and said retaining head, at least three axially extending ribs integrally formed on said elongate body directly below said pressure head, said ribs extending radially in an equal spaced arrangement about the center of said cylindrical body and a female part having a receptacle for said body, the interior wall portion adjacent the opening for said receptacle defining a circular opening having a diameter of substantially the same size as the diameter defined by an imaginary circle drawn through the outer marginal surface of said ribs to thereby provide axial centering and entrainment of said elongate body relative to said receptacle, and at least one circumferential sector for retaining said retaining head axially, wherein said retaining edge is adapted to penetrate said at least one retaining sector to provide an axial abutment opposing withdrawal of said male part from said receptacle.

2. Fixing device according to claim 1, wherein said snap-fastener surface has a hemispherical shape whereby said retaining edge is circular.

3. Fixing device according to claim 1, wherein said retaining surface is a plane radial surface.

4. Fixing device according to claim 3, wherein said retaining surface is annular.

5. Fixing device according to claim 1, wherein the hardness of the material of said female part is significantly lower than that of the material of said male part.

* * * * *